(12) United States Patent
Kim

(10) Patent No.: US 11,780,444 B2
(45) Date of Patent: Oct. 10, 2023

(54) DRIVING ASSISTANCE APPARATUS AND IMAGE PROCESSING METHOD

(71) Applicant: SAMSUNG ELECTRONICS CO., LTD., Suwon-si (KR)

(72) Inventor: Shinwook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 389 days.

(21) Appl. No.: 17/265,647

(22) PCT Filed: Oct. 4, 2019

(86) PCT No.: PCT/KR2019/013037
§ 371 (c)(1),
(2) Date: Feb. 3, 2021

(87) PCT Pub. No.: WO2020/071853
PCT Pub. Date: Apr. 9, 2020

(65) Prior Publication Data
US 2021/0383140 A1    Dec. 9, 2021

(30) Foreign Application Priority Data
Oct. 4, 2018 (KR) .......................... 10-2018-0118011

(51) Int. Cl.
*B60W 40/02* (2006.01)
*G06V 20/58* (2022.01)
(Continued)

(52) U.S. Cl.
CPC ............. *B60W 40/02* (2013.01); *G06V 10/40* (2022.01); *G06V 10/774* (2022.01); *G06V 20/582* (2022.01); *B60W 2420/42* (2013.01)

(58) Field of Classification Search
None
See application file for complete search history.

(56) References Cited

U.S. PATENT DOCUMENTS 6,813,545 B2 * 11/2004 Stromme ............. G06V 20/582
382/104
9,092,695 B1 * 7/2015 Ogale .................. G06V 10/751
(Continued)

FOREIGN PATENT DOCUMENTS

CN    103489324    9/2015
JP    3006471    2/2000
(Continued)

OTHER PUBLICATIONS

International Search Report for PCT/KR2019/013037 dated Jan. 17, 2020, 2 pages.
(Continued)

*Primary Examiner* — Leon Viet Q Nguyen
(74) *Attorney, Agent, or Firm* — Nixon & Vanderhye, P.C.

(57) ABSTRACT

Disclosed is a driving assistance apparatus which can be mounted on a vehicle. The driving assistance apparatus includes an image capturing part, and a processor configured to identify a specific color area in a peripheral image captured by the image capturing part as a first candidate area, identify an area including a specific shape in the first candidate area as a second candidate area, and identify an area of a traffic sign in the second candidate area.

10 Claims, 9 Drawing Sheets

(51) Int. Cl.
*G06V 10/774* (2022.01)
*G06V 10/40* (2022.01)

(56) References Cited

U.S. PATENT DOCUMENTS

| | | | |
|---|---|---|---|
| 9,501,703 B2 | 11/2016 | Oh et al. | |
| 2015/0278615 A1* | 10/2015 | Ogawa | H04N 7/183 348/148 |
| 2017/0270375 A1* | 9/2017 | Grauer | H04N 23/11 |
| 2019/0333222 A1* | 10/2019 | Gatti | G06T 7/143 |

FOREIGN PATENT DOCUMENTS

| | | |
|---|---|---|
| JP | 2007-057331 | 3/2007 |
| JP | 2008-262467 | 10/2008 |
| JP | 4762026 | 8/2011 |
| KR | 10-1014125 | 2/2011 |
| KR | 10-2012-0057351 | 6/2012 |
| KR | 10-1178507 | 9/2012 |
| KR | 10-2014-0066847 | 6/2014 |
| KR | 10-1409340 | 6/2014 |
| KR | 10-2015-0081480 | 7/2015 |
| KR | 10-1596299 | 2/2016 |

OTHER PUBLICATIONS

Written Opinion of the ISA for PCT/KR2019/013037 dated Jan. 17, 2020, 8 pages with an English Translation.
Korean Office Action for KR10-2018-0118011 dated Nov. 20, 2020, 9 pages with an English Translation.

* cited by examiner

100

$630 - A_2 = [a_1 \ a_2 \ a_3 \ \cdots \ a_N]$ $635 - D_2 = [|a_1-a_2| \ |a_2-a_3| \cdots |a_{N-1}-a_N|]$

DRIVING ASSISTANCE APPARATUS AND IMAGE PROCESSING METHOD

BACKGROUND

Field

The disclosure relates to a driving assistance apparatus and an image processing method. More particularly, the disclosure relates to a driving assistance apparatus for identifying a traffic sign and an image processing method.

Description of Related Art

Traffic signs promote traffic safety and make traffic flow smoothly in a consistent and unified way to road users, and provide various information required to protect road facilities. Since these traffic signs can exist anywhere on the road, an entire area of an image captured in real time must be searched for effective recognition.

However, in the related art, excessive calculations were consumed for searching the entire image area, which made real-time search difficult, or the amount of calculation was reduced, thereby decreasing a recognition rate.

SUMMARY

The disclosure is to provide a driving assistance apparatus that identifies a candidate area of traffic signs based on color information and shape information of a captured image to increase identification performance of traffic signs and to reduce the amount of calculation, and an image processing method.

In addition, an objective of the disclosure is to make traffic signs detected robustly against damage or contamination of the sign in detecting a traffic sign area.

According to an embodiment of the disclosure, a driving assistance apparatus includes an image capturing part, and a processor configured to identify a specific color area in a peripheral image captured by the image capturing part as a first candidate area, identify an area including a specific shape in the first candidate area as a second candidate area, and identify an area of a traffic sign in the second candidate area.

The processor may be configured to identify the second candidate area as a plurality of first blocks based on a first direction, and acquire first pixel information based on a pixel value included in each of the plurality of first blocks, identify the second candidate area as a plurality of second blocks based on a second direction, and acquire second pixel information based on a pixel value included in each of the plurality of second blocks, and identify an area of the traffic sign based on the first pixel information and the second pixel information.

The first pixel information may be configured to include a difference value between an average value of pixels included in each of the plurality of first blocks, and an average value of pixels included in adjacent first blocks, and wherein the second pixel information is configured to include a difference value between an average value of pixels included in each of the plurality of second blocks, and an average value of pixels included in adjacent second blocks.

The processor may be configured to apply the first pixel information and the second pixel information to a training model to identify the area of the traffic sign.

The training model may be configured to identify a plurality of sample traffic sign images as a plurality of blocks, and learn and obtain pixel information based on pixel values included in each of the plurality of blocks.

The processor may be configured to identify red (R) color, green (G) color, and blue (B) color included in the peripheral image, and identify an area in which a pixel value of the R color is equal to or greater than a predetermined multiple of pixel values of the G color and the B color as the first candidate area.

The apparatus may further include at least one among illuminance sensor and rain sensor.

The pre-determined multiple may be configured to be updated based on at least one of illuminance measured by the illuminance sensor and rainfall measured by the rain sensor.

The processor may be configured to, based on the first candidate area being identified, include a binary image including only the first candidate area among the peripheral images, and identify the second candidate area based on the acquired binary image.

The apparats may further include a storage configured to store reference shape information of a traffic sign, based on the reference shape information being identified from the first candidate area, and identifying the first candidate area as the second candidate area.

The apparatus may further include a display.

The processor may be configured to control the display to identify and provide at least one of a type and an instruction content of the traffic sign in the identified traffic sign area, and based on at least one of the type and instruction content of the traffic sign, control the vehicle.

According to an embodiment of the disclosure, a method of image processing includes acquiring a peripheral image of a vehicle through an image capturing part, identifying a first candidate area based on color information included in the acquired peripheral image, identifying a second candidate area based on shape information included in the first candidate area, and identifying the second candidate area as a plurality of blocks, and identifying an area of traffic sign based on pixel values included in each of the plurality of blocks.

The identifying the traffic sign area may be configured to identify the second candidate area as a plurality of first blocks based on a first direction, and acquire first pixel information based on a pixel value included in each of the plurality of first blocks, identify the second candidate area as a plurality of second blocks based on a second direction, and acquire second pixel information based on a pixel value included in each of the plurality of second blocks, and identify an area of the traffic sign based on the first pixel information and the second pixel information.

The first pixel information may be configured to include a difference value between an average value of pixels included in each of the plurality of first blocks, and an average value of pixels included in adjacent first blocks.

The second pixel information may be configured to include a difference value between an average value of pixels included in each of the plurality of second blocks, and an average value of pixels included in adjacent second blocks.

The identifying the traffic sign area may be configured to apply the first pixel information and the second pixel information to a training model to identify the area of the traffic sign.

The training model may be configured to identify a plurality of sample traffic sign images as a plurality of blocks, and learn and obtain pixel information based on pixel values included in each of the plurality of blocks.

The identifying the first candidate area may be configured to identify red (R) color, green (G) color, and blue (B) color included in the peripheral image, and identify an area in which a pixel value of the R color is equal to or greater than a predetermined multiple of pixel values of the G color and the B color as the first candidate area.

The predetermined multiple may be configured to be updated based on at least one of illuminance and rainfall.

The identifying the second candidate area may include, based on the first candidate area being identified, acquiring a binary image including only the first candidate area among the peripheral images, and identifying the second candidate area based on the acquired binary image.

The identifying the second candidate area may include, based on the reference shape information of a traffic sign pre-stored in the first candidate area being identified in the first candidate area, identifying the first candidate area as the second candidate area.

The image processing method may further include providing at least one of a type and an instruction content of the traffic sign in the identified traffic sign area, and based on at least one of the type and instruction content of the traffic sign, controlling the vehicle.

As described above, according to various embodiments of the disclosure, since the driving assistance apparatus is based on color information and shape information of a captured image, it is possible to increase accuracy of identifying a candidate area of a traffic sign.

In addition, since the apparatus is based on pixel value information included in the captured image, the amount of computation consumed to identify a traffic sign is reduced, and traffic sign information is provided to a user in real time, thereby helping safe driving.

DETAILED DESCRIPTION

Figure 1:
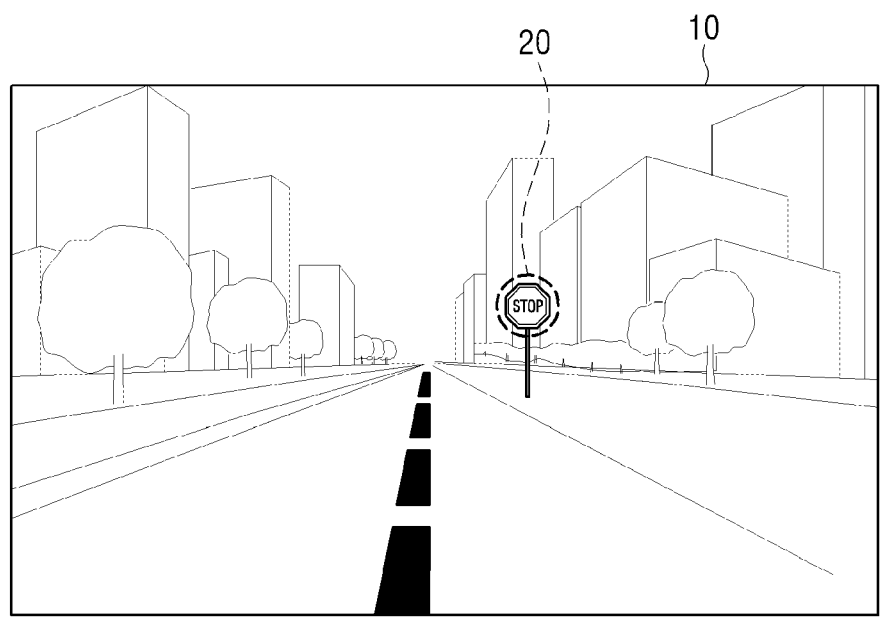
FIG. 1 is a view illustrating a peripheral image including a traffic sign to support understanding of the disclosure.

Hereinafter, the disclosure will be described in detail with reference to the accompanying drawings.

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary embodiments to a specific embodiment form. Instead, modifications, equivalents and replacements included in the disclosed concept and technical scope of this specification may be employed. While describing exemplary embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The expression at least one of A and B is to be understood as indicating either "A" or "B" or "A and B".

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The example embodiments of the disclosure will be described in greater detail below in a manner that will be understood by one of ordinary skill in the art. However, exemplary embodiments may be realized in a variety of different configurations, and not limited to descriptions provided herein. Also, well-known functions or constructions are not described in detail since they would obscure the invention with unnecessary detail.

Hereinafter, exemplary embodiments will be described in greater detail with reference to the accompanying drawings.

FIG. 1 is a view illustrating a peripheral image including a traffic sign to support understanding of the disclosure.

Referring to FIG. 1, the driving assistance apparatus according to an embodiment of the disclosure may monitor a surrounding environment using a sensor provided. For example, the driving assistance apparatus may acquire a peripheral image 10 by capturing a surrounding environment, road conditions in front, or the like using an image capturing part. The image capturing part is a component that captures the surrounding environment of a vehicle and events occurring on a driving path of the vehicle, and may be referred to as a sensor, a camera, and an image sensor, but hereinafter, for convenience of description, it will be referred to as the image capturing part in the disclosure.

The driving assistance apparatus according to an embodiment of the disclosure may acquire a peripheral image 10 through an image capturing part, identify a traffic sign 20 area included in the peripheral image 10, and provide the identified information to the user. Hereinafter, various embodiments of the disclosure will be described in detail with reference to the drawings.

Figure 2:
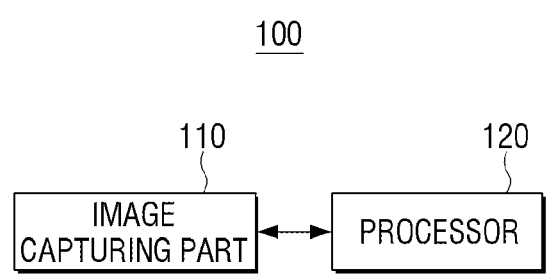
FIG. 2 is a block diagram indicating a configuration of a driving assistance apparatus according to an embodiment of the disclosure.

FIG. 2 is a block diagram indicating a configuration of a driving assistance apparatus according to an embodiment of the disclosure. The driving assistance apparatus 100 of FIG. 2 may be mounted on a vehicle and used. Specifically, the driving assistance apparatus 100 may be implemented as an electric system of a vehicle or a camera module installed inside the vehicle. Alternatively, it may be implemented as a room mirror-integrated module, and may be implemented in a form of a portable device such as a mobile phone, a PDA, or the like that is detachable to the vehicle. Alternatively, it may be implemented as the vehicle itself.

Referring to FIG. 2, the driving assistance apparatus 100 includes an image capturing part 110 and a processor 120.

The image capturing part 110 may capture a peripheral image 10 of a vehicle. For example, traffic signs, other vehicles, or the like located around the vehicle may be captured through the image capturing part 110. The image capturing part 110 may be implemented with a single camera or a plurality of cameras.

The processor 120 controls overall operation of the driving assistance apparatus 100.

According to an embodiment, the processor 120 may be implemented as a digital signal processor (DSP), a microprocessor, or a time controller (TCON) that processes digital signals, but is not limited thereto. The processor 120 may include one or more of central processing unit (CPU), microcontroller unit (MCU), micro processing unit (MPU), controller, or communication processor (CP), ARM processors, or may be defined as the corresponding term. In addition, the processor 120 may be implemented in a form of a system on chip (SoC) or large scale integration (LSI) with a built-in processing algorithm, or a field programmable gate array (FPGA).

The processor 120 may acquire the peripheral image 10 captured through the image capturing part 110. The peripheral image 10 may be a peripheral image of a vehicle in which the driving assistance apparatus 100 is mounted. For example, the processor 120 may acquire a peripheral image 10 including a traffic sign, etc. in real time through the image capturing part 110. The traffic signs may be signs displayed in a consistent and unified manner for traffic safety, and there may be types such as caution signs, regulatory signs, instruction signs, auxiliary signs, road signs, or the like, and shapes such as round, triangle, square, octagon, etc.

The processor 120 may identify a specific color area in the peripheral image 10 as a first candidate area. The processor 120 may identify the first candidate area based on color information included in the peripheral image 10. The candidate area refers to an area that becomes a candidate in which a traffic sign may exist.

Specifically, the processor 120 may identify red (R) color, green (G) color, and blue (B) color values included in the peripheral image 10. In other words, the processor 120 may identify R, G, and B color values included in the peripheral image 10 as color information. The color value may refer to a pixel value, and each pixel value of R, G, and B may be represented as one of 0 to 255 according to brightness. For example, if a pixel value of color R is 255, a pixel value of color G and color B is 0, the pixel may be represented in red, and if the pixel value of color R, color G, and color B is 0, the pixel may be represented in black.

The processor 120 may identify an area in which the pixel value of the R color is equal to or greater than a predetermined multiple of the pixel values of the G color and the B color as a first candidate area. When the pixel value of the R color is larger than the rest, the corresponding pixel may represent color in R.

Meanwhile, borders of caution signs to inform road users to take safety actions when there are dangerous substances or road conditions are dangerous, and regulatory signs to notify restrictions that are restricted or prohibited for safety of road traffic generally use red color. Accordingly, the processor 120 may identify an area in which the R color pixel value is higher than the remaining colors in the peripheral image 10, as a candidate area of the traffic sign.

When the first candidate area is identified, the processor 120 may acquire a binary image including only the first candidate area of the peripheral image 10. The binary image may be an image in which the peripheral image 10 is expressed with only two colors.

A process of acquiring the binary image may be performed using Equation 1 below. The binary image acquired through Equation 1 may be represented only in black color and white color.

$$G_{(i,j)} = \begin{cases} 0, & \text{if } \text{MAX}(R, G, B) = R, R \geq \sigma_G \cdot G, \text{ and } R \geq \sigma_G \cdot B \\ 255, & \text{Otherwise} \end{cases} \quad \text{[Equation 1]}$$

$G_{(i,j)}$ is a pixel value on a binary image of (i, j) coordinates, and R is a pixel value of R color, G is a pixel value of G color, B is a pixel value of B color, $\sigma_G$ and $\sigma_B$ are predetermined multiple multiplied by the pixel of the G color and the pixel value of color B, respectively.

The peripheral image 10 may be changed to a binary image having a pixel value of 0, and 255 otherwise, when the pixel value of the R color is equal to or greater than the predetermined multiple of the pixel value of the G color and the B color.

Specifically, the pixel value of the R color is the largest (MAX(R, G, B)=R) among the R, G, and B colors, and the pixel value of the R color is greater than a value obtained by multiplying each of predetermined multiples of $\sigma_G$ and $\sigma_B$ by G pixel value and B pixel value, the processor 120 may represent the corresponding pixel in black color (pixel value of 0), and the remaining pixels may be represented in white color (pixel value of 255). In other words, the processor 120 may acquire a binary image representing an area having a high pixel value ratio of R color in black and the remaining area in white. However, in Equation 1, the area with a high pixel value ratio of the R color is represented in black and the remaining area is represented in white, but this is only an example, and if the first candidate area in the peripheral image 10 is a form that can be distinguished from the remaining area, it may be represented in various ways.

The predetermined multiple may be updated based on at least one of illuminance measured through an illuminance sensor (not illustrated) and rainfall measured through a rain sensor (not illustrated). In other words, the predetermined multiple may be changed according to the surrounding environmental conditions.

For example, a predetermined multiple when the surrounding environment of the vehicle is very bright may be a value greater than a predetermined multiple when the surrounding environment is very dark. When the surrounding environment is very bright, since the pixel value of R color is also measured high, a predetermined multiple may be increased to discriminate only when the pixel value of R color has a larger difference compared to the G color and the B color. Accordingly, the accuracy in which the processor 120 identifies the R color system may be increased. In addition, when the surrounding environment is very dark, the difference between the pixel values of the peripheral image 10 is smaller than when the surrounding environment is bright, and thus the predetermined multiple may be reduced to a relatively small value.

The predetermined multiple may be changed to various values according to an illuminance level, as shown in Table 1. As such, predetermined multiples $\sigma_G$ and $\sigma_B$ may be measured through experiments in various environments and stored in a storage unit (not shown) in a form of a lookup table.

TABLE 1

| Illuminance level | $\sigma_G$ | $\sigma_B$ |
|---|---|---|
| Level 1 (darkest) | 1 | 1 |
| Level 2 (dark) | 1.1 | 1.1 |
| Level 3 (bright) | 1.2 | 1.2 |
| Level 4 (brightest) | 1.3 | 1.3 |

The lookup table shown in Table 1 may be used to identify an area where a R color ratio is higher than that of the other colors in the peripheral image 10, based on illuminance information measured by an illuminance sensor. In Table 1, each illuminance level is classified into darkest, dark, bright, and brightest, and this indicates a relative illuminance level. This classification of the illuminance level is an example, and it is possible to accurately distinguish the illuminance level according to a threshold value by setting a plurality of illuminance threshold values.

Meanwhile, a numerical value regarding the predetermined multiple in the table 1 $\sigma_G$ and $\sigma_B$ is merely an example, and may be changed to a different value depending on various environmental conditions such as change of the type of sensor, or the like. In addition, in Table 1 $\sigma_G$ and $\sigma_B$ are described as the same value, but may have different values.

Meanwhile, the predetermined multiple may be changed based on rainfall measured through a rain sensor. For example, a predetermined multiple according to the degree of rainfall may be measured and stored in the form of the lookup table.

Meanwhile, information on illuminance and rainfall may be received from an external server (not shown) without measuring illuminance and rainfall through a sensor.

The processor 120 may more accurately identify a traffic sign area by adjusting the predetermined multiple in consideration of the surrounding environment of the vehicle.

According to an embodiment of the disclosure, a method of identifying an R color area through a size between pixel values of R, G, and B colors is a simple computation and may reduce the amount of computation of the processor 120.

In addition, it is possible to reduce the amount of computation of the processor 120 by identifying candidate areas of traffic signs on the peripheral image 10 and identifying the traffic signs only in the corresponding candidate areas.

However, depending on setting, an area having a large pixel value of R color may be identified as a candidate area of a traffic sign even though it is not a red color but a yellow color.

According to an embodiment of the disclosure, the processor 120 may identify an area including a specific shape within the first candidate area as a second candidate area. The processor 120 may identify the second candidate area based on shape information included in the first candidate area. Specifically, the processor 120 may identify the second candidate area based on the binary image acquired according to the color information. In other words, the processor 120 may, in an area where the pixel value of R color is equal to or greater than the predetermined multiple of the pixel values of G color and B color is represented in black color, and the remaining area is represented in white, identify a second candidate area based on shape information included the area represented in black color.

The processor 120 may identify shape information included in the first candidate area by moving a window of a predetermined size on the binary image around the first candidate area. However, the processor 120 may identify shape information included in the first candidate area by moving the window of the predetermined size on the binary image over the entire image area.

When reference shape information is identified in the first candidate area, the processor 120 may identify the first candidate area as a second candidate area. The reference shape information may be information on shape of a sample traffic sign. For example, the reference shape information may include triangular shape information indicating a caution mark, circular shape information indicating a regulatory mark, square shape information, octagon shape information, or the like. The reference shape information may be stored in a storage unit when manufacturing the driving assistance apparatus 100 or may be received from an external server. The external server may be implemented as a cloud server, but is not limited thereto.

In other words, the processor 120 may compare the shape information acquired in the first candidate area with the reference shape information stored in the storage unit, and identify the area including the acquired shape information as the second candidate area if the acquired shape information matches the reference shape information. For example, if circular shape information is identified on the acquired binary image, the processor 120 may identify that the circular shape information matches the reference shape information and identify the area including the circular shape as the second candidate area. Alternatively, if diamond shape information is identified on the acquired binary image, the processor 120 may identify that the diamond shape information does not match the reference shape information, such that the processor 120 may not identify the corresponding area as the second candidate. In other words, the diamond shape area may be identified as an area in which no traffic sign exists.

The processor 120 may identify the second candidate area as a plurality of blocks. Specifically, the processor 120 may identify the second candidate area as a plurality of first blocks based on a first direction, and may identify the second candidate area as a plurality of second blocks based on a second direction.

For example, the processor 120 may identify the second candidate area as a plurality of M*N-shaped blocks based on a horizontal and vertical directions.

The processor 120 may acquire pixel information based on pixel values included in each of the plurality of blocks. Specifically, the processor 120 may acquire first pixel information based on pixel values included in each of the plurality of first blocks, and acquire second pixel information based on pixel values included in each of the plurality of second blocks.

The first pixel information may include a difference value between an average value of a pixel included in each of the plurality of first blocks and an average value of pixels included in adjacent first blocks. In addition, the second pixel information may include a difference value between an average value of pixels included in each of the plurality of second blocks and an average value of pixels included in adjacent second blocks.

For example, it is assumed that the processor 120 identifies the second candidate area as 3*3 block.

The first block is composed of a first row, a second row, and a third row block based on the horizontal direction. In addition, the second block is composed of a first column, a second column, and a third column block based on the vertical direction.

The first pixel information may include an average value of pixels included in each of the first row, second row, and third row blocks, a difference value between the average value of the first row and the second row, which are adjacent blocks, and a difference value between the average value of the second row and the third row.

The second pixel information may include an average value of pixels included in each of a first column, a second column, and a third column blocks, a difference value between average values of the first column and the second column, which are adjacent blocks, and a difference value between average values of the second column and the third column.

The processor 120 may acquire a feature vector or a matrix value corresponding to the acquired first pixel information and the second pixel information. The feature vector may be a vector listing first direction average value information, difference value information between the first direction average values, second direction average value information, and difference value information between the second direction average values. A method of acquiring the first pixel information and second pixel information described above will be described in detail in FIG. 6 to be described below.

The processor 120 may identify traffic sign area based on the acquired pixel information. According to an embodiment, the processor 120 may identify the traffic sign area based on the first pixel information and the second pixel information.

According to another embodiment, the processor 120 may apply the first pixel information and the second pixel information to a training model to identify the traffic sign area.

The training model may be a model acquired by identifying a plurality of sample traffic sign images as a plurality of blocks and learning pixel information based on pixel values included in each of the plurality of blocks. The training model may be implemented with a cognitive system such as an artificial neural network or a neuromorphic processor.

For example, the training model may be a model acquired by identifying a "maximum speed limit sign", which is a sample in a circular shape, as a plurality of M*N blocks and learning pixel information based on pixel values included in each of the plurality of blocks. In other words, the training model may be a model in which a matrix value corresponding to the sample traffic sign or feature vector is learned.

The training model may analyze matrix values of input pixel information and learned pixel information, or a similarity of a feature vector to identify and output whether an object corresponding to the input pixel information is a traffic sign.

When the second candidate area is identified as including the traffic sign by the training model, the processor 120 may identify numbers or symbols inside the traffic sign through image recognition technology to identify at least one of a type and indication of the traffic sign. The image recognition technology may include pattern matching, optical character recognition (OCR), or the like. For example, when the second candidate area is identified as including the traffic sign by the training model, the processor 120 may acquire the number "80" displayed inside the traffic sign through the OCR technology, and identify a maximum speed of the road the vehicle is currently running is 80 Km/h. Alternatively, the type and instruction of traffic signs may be identified through a training model using a separate artificial neural network.

The processor 120 may control a display (not shown) to provide at least one of the identified traffic sign type and instruction. The display may be provided inside the driving assistance apparatus 100, but is not limited thereto, and may be implemented as an external display device (not shown). It may be implemented in various forms such as a display included in a navigation provided in a vehicle, a head up display (HUD) displayed on an area of a windshield of a vehicle, a display displayed on an instrument panel area. The processor 120 may transmit information on at least one of the identified traffic sign type and instruction to an external display device to display the traffic sign type and instruction content on the external display device.

The processor 120 may control the vehicle based on at least one of the identified traffic sign type and instruction content. For example, when the identified traffic sign is a stop sign, the processor 120 may control the vehicle to stop. Alternatively, when the instruction content of the identified traffic sign is a speed limit sign with a maximum speed of 100 Km/h or less, the processor 120 may control the maximum speed of the vehicle to not exceed 100 Km/h.

The processor 120 may provide feedback notifying at least one of the identified traffic sign type and instruction content. For example, the feedback may have a form of vibrating a part of a vehicle such as a steering wheel or outputting a specific sound or voice.

According to another embodiment, the processor 120 may identify a traffic sign by identifying the first candidate area as a plurality of blocks and applying pixel information acquired based on pixel values included in each of the plurality of blocks to the training model. In other words, the processor 20 may identify whether it is a traffic sign by omitting a step of identifying the second candidate area based on the shape information, applying the pixel information acquired based on the pixel values included in each of the plurality of blocks to the training model, and analyzing the shape information in the training model.

In the above, it has been described that the first candidate area is identified based on color information, the second candidate area is identified based on the shape information, and the traffic sign is finally identified within the second candidate area, but the order may be changed. For example, after identifying the first candidate area based on the shape information, the second candidate area may be identified based on the color information. This operation is also just an example, and the order may be arbitrarily changed according to the amount of computation.

FIG. 2 describes based on the driving assistance apparatus 100 including the image capturing part 110 and the processor 120, but may be implemented in a form excluding the image capturing part 110 according to an implementation example. In this case, the driving assistance apparatus may be configured with a memory and/or a processor. The peripheral image 10 may be acquired through an interface connected to an external camera.

Figure 3:
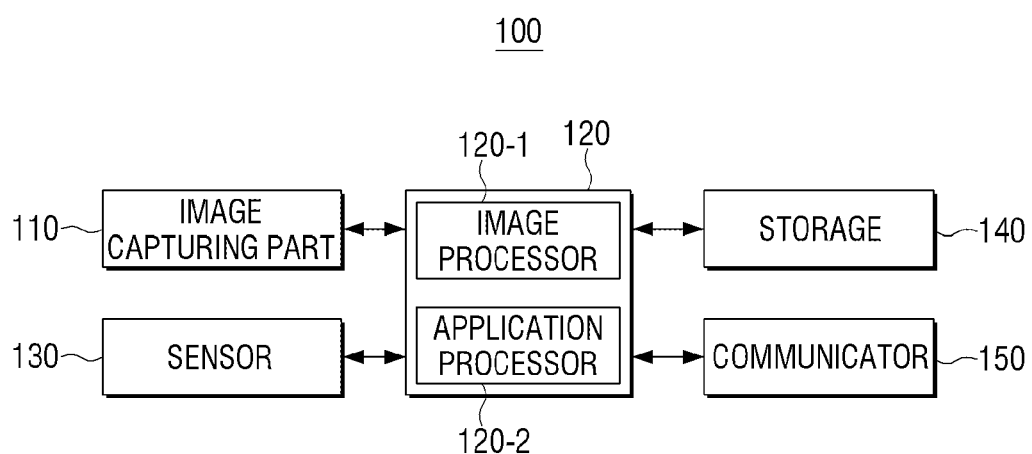
FIG. 3 is a block diagram illustrating an example of a detailed configuration of a driving assistance apparatus of FIG. 2.

FIG. 3 is a block diagram illustrating an example of a detailed configuration of a driving assistance apparatus.

According to FIG. 3, the driving assistance apparatus 100 includes an image capturing part 110, a processor 120, a sensor 130, a storage 140, and a communicator 150. The elements shown FIG. 2 will not be described in detail.

The processor 120 may include, for example, and without limitation, a CPU, a ROM (or a non-volatile memory) in which a control program for controlling the driving assistance apparatus 100 is stored and a RAM (or volatile memory) used to store data input from outside of the driving assistance apparatus 100 or used as a storage area corresponding to various operations performed in the driving assistance apparatus 100.

When a predetermined event occurs, the processor 120 may execute an operating system (OS), programs, and various applications stored in the storage 140. The processor 120 may include a single core, a dual core, a triple core, a quad core, and core of a multiple thereof.

The processor 120 may include an image processor 120-1 and an application processor 120-2.

The image processor 120-1 is a component that processes image data. In particular, the image processor 120-1 may control an overall operation of identifying a traffic sign area. Specifically, the image processor 120-1 may identify a specific color area in a peripheral image captured by the image capturing part 110 as a first candidate area, identify an area including a specific shape within the first candidate area is as a second candidate area, and identify an area of a traffic sign within the second candidate area. Since the operation of identifying the traffic sign area has been described above, a detailed description will be omitted.

The application processor 120-2 may drive various applications and is a component that performs graphic processing. The application processor 120-2 may access the storage 140, and perform booting by using the stored operating system (OS) of the storage 140. Further, the application processor 120-2 may perform various operations using various kinds of programs, content, and data stored in the storage 140. In addition, the application processor 120-2 may access web database to perform various operations, and may use sensing information received from the sensors 130.

The sensor 130 is a component that senses information on the surrounding environment of the vehicle. In particular, the sensor 130 may include an illuminance sensor and a rain sensor. The illuminance sensor is a component that measures illuminance of the surrounding environment of the vehicle, and the rain sensor is a sensor that measures rainfall around the vehicle.

In addition, the sensor 130 may include a global positioning system (GPS), an inertial measurement unit (IMU), a RADAR unit, a LIDAR unit, and an image sensor. In addition, the sensor 130 may include at least one of a temperature/humidity sensor, an infrared sensor, an atmospheric pressure sensor, and a proximity sensor, but is not limited thereto, and may include various types of sensors that detects information on the surrounding environment of the vehicle, and provides it to the driver and processor 120.

In addition, the sensor 130 may include a motion sensing device capable of sensing the movement of the vehicle. The motion sensing device may include a magnetic sensor, an acceleration sensor, and a gyroscope sensor.

The GPS is a component that detects a geographic location of a vehicle, and the processor 120 may also acquire location information detected through GPS when a peripheral image 10 is acquired.

The IMU may be a combination of sensors configured to detect changes in the vehicle's position and orientation based on inertial acceleration. For example, the combination of sensors may include accelerometers and gyroscopes.

The RADAR unit may be a sensor configured to detect objects in the environment in which the vehicle is located using a wireless signal. In addition, the RADAR unit may be configured to detect a speed and/or direction of objects.

The LIDAR unit may be a sensor configured to detect objects in the environment in which the vehicle is located using a laser.

The storage 140 may store various data, programs or applications which are used to drive and control the driving assistance apparatus 100. The storage 140 may store a control program for controlling the driving assistance apparatus 100 and the processor 120, an application initially provided by a manufacturer or downloaded from an external source, databases, or related data.

In particular, the storage 140 may store information on a reference shape of a traffic sign. The reference shape information may be information on a shape of the traffic sign. For example, the reference shape information may include triangular shape information indicating a caution sign, circular shape information indicating a regulatory sign, square shape information, octagon shape information, or the like.

The storage unit 140 may be implemented as an internal memory such as ROM, RAM, etc. included in the processor 120, or may be implemented as a memory separate from the processor 120. The storage unit 140 may be implemented in a form such as a non-volatile memory, a volatile memory, a hard disk drive (HDD), or a solid state drive (SSD).

However, according to another embodiment of the disclosure, it is possible to receive reference shape information from a server (not shown). The server may be implemented as a cloud server, but is not limited thereto.

The communicator 150 may further perform communication with an external apparatus (not illustrated). As an example, the communicator 150 may communicate with an external server according to a wired/wireless communication method, such as BlueTooth (BT), Wireless Fidelity (WI-FI), Zigbee, Infrared (IR), serial interface, universal serial bus (USB), near field communication (NFC), Vehicle to Everything (V2X), mobile communication (Cellular), or the like.

The communicator 150 may receive information on the reference shape of a traffic sign from an external server. In addition, the communicator 150 may receive various information related to a current location of a vehicle and route from the external server. For example, the communicator 150 may receive weather information, news information, road condition information, or the like from the external server. The road condition information may mean condition information on a path (or road) on which the vehicle is traveling. For example, various information such as road surface condition information, traffic condition information, traffic accident information, traffic control information, or the like may be received.

A display (not shown) displays various contents including vehicle driving information. The vehicle driving information may include a current speed of the vehicle, a speed limit of a road on which the vehicle is currently running, traffic sign information, or the like. In particular, the display may display at least one of a type and instruction content of the traffic sign identified by a control of the processor 120.

The display may be implemented as various forms such as liquid crystal display (LCD), organic light-emitting diode (OLED), liquid crystal on silicon (LCoS), digital light processing (DLP), quantum dot (QD), micro light-emitting diode (LED) display, etc. In particular, the display may be implemented in a form of a touch screen forming a layer structure with a touch pad. In this case, the display may be used as a user interface (not shown) other than the outputter. The touch screen may be configured to detect not only touch input location and area, but also a touch input pressure.

However, the driving assistance apparatus 100 may be implemented in a state that does not include the above-described display.

Figure 4A:
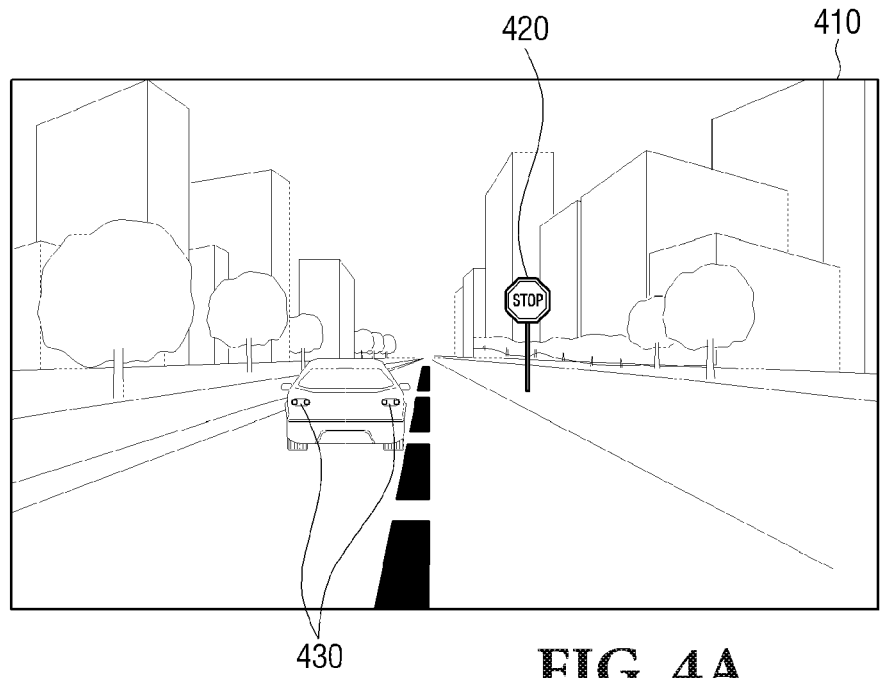
FIGS. 4A and 4B are views illustrating a process of identifying a first candidate area according to an embodiment of the disclosure.
Figure 4B:
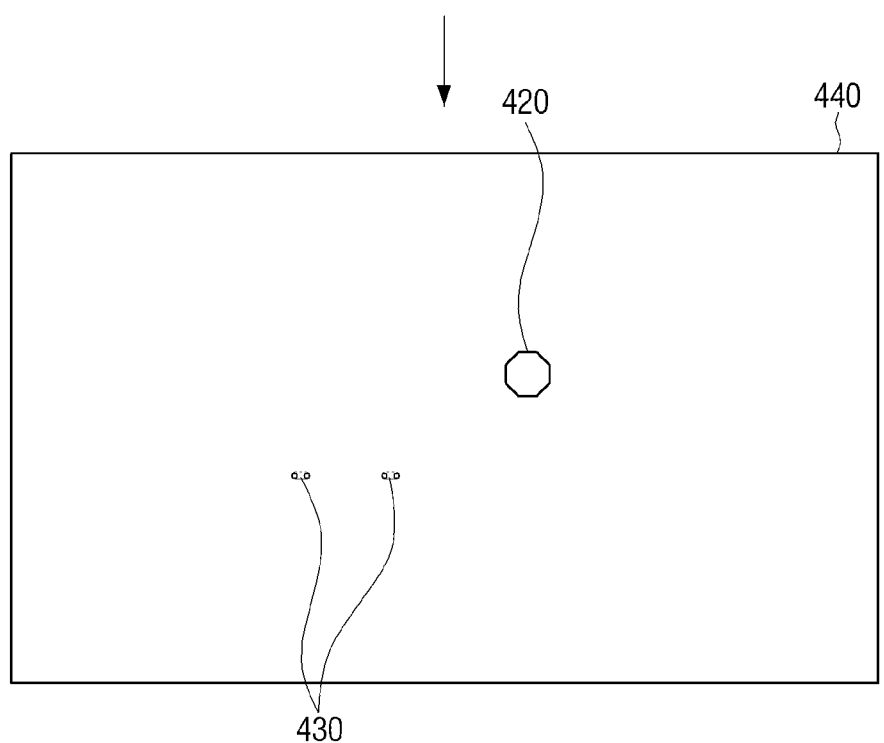

FIGS. 4A and 4B are views illustrating a process of identifying a first candidate area according to an embodiment of the disclosure.

FIG. 4A is a peripheral image 410 of a vehicle obtained through the image capturing part 110. The peripheral image 410 may include surrounding environments such as a path on which the vehicle is running, an external vehicle, a traffic sign, or the like.

The driving assistance apparatus 100 may identify the first candidate area based on color information included in the peripheral image 410. Specifically, the driving assistance apparatus 100 may identify an area in which the pixel value of the R color included in the peripheral image 410 is equal to or greater than a predetermined multiple of the pixel values of the G color and the B color as the first candidate area.

According to FIG. 4A, the pixel value of R color of an area corresponding to an octagonal object 420 and a taillight 430 of an external vehicle may be identified as an area that is equal to or greater than the predetermined multiple of the pixel values of the G color and the B color, and identified as a first candidate area.

In this case, the driving assistance apparatus 100 may obtain a binary image 440 including only the first candidate area.

FIG. 4B is a binary image 440 in which only the first candidate area is represented in black color and the remaining areas are represented in white color.

Accordingly, only a rim of the octagonal object 420 and the taillight 430 of the external vehicle may be displayed on the binary image 440.

However, in the binary image 440 according to FIG. 4B, the first candidate area is represented in black and the remaining area is represented in white, but this is only an example, and if the first candidate area in the peripheral image 410 is a form that can be distinguished from the remaining areas, it may be represented in various ways.

Figure 5A:
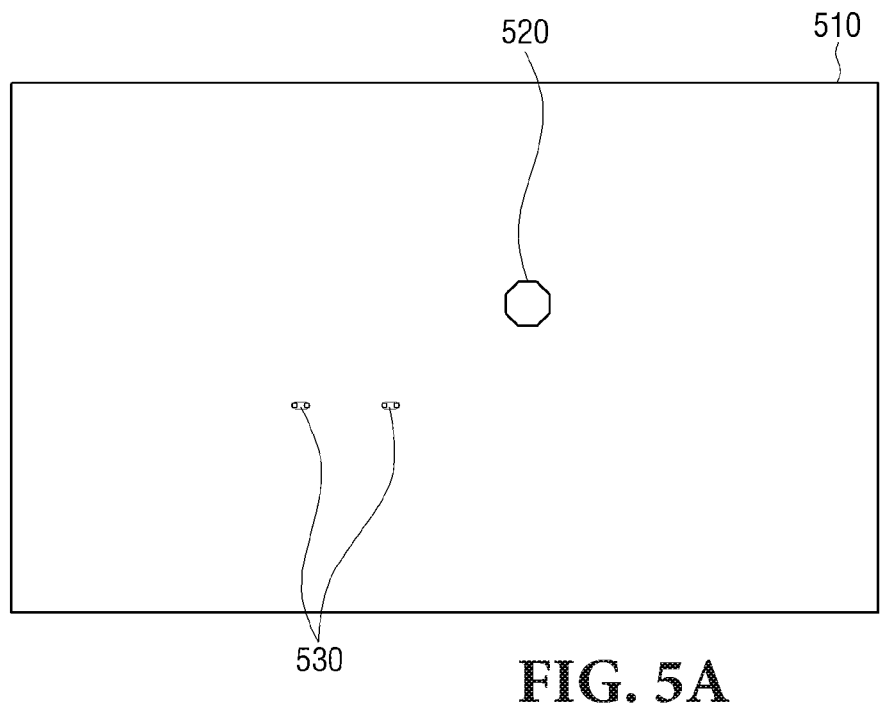
FIGS. 5A and 5B are views illustrating a process of identifying a second candidate area according to an embodiment of the disclosure.
Figure 5B:
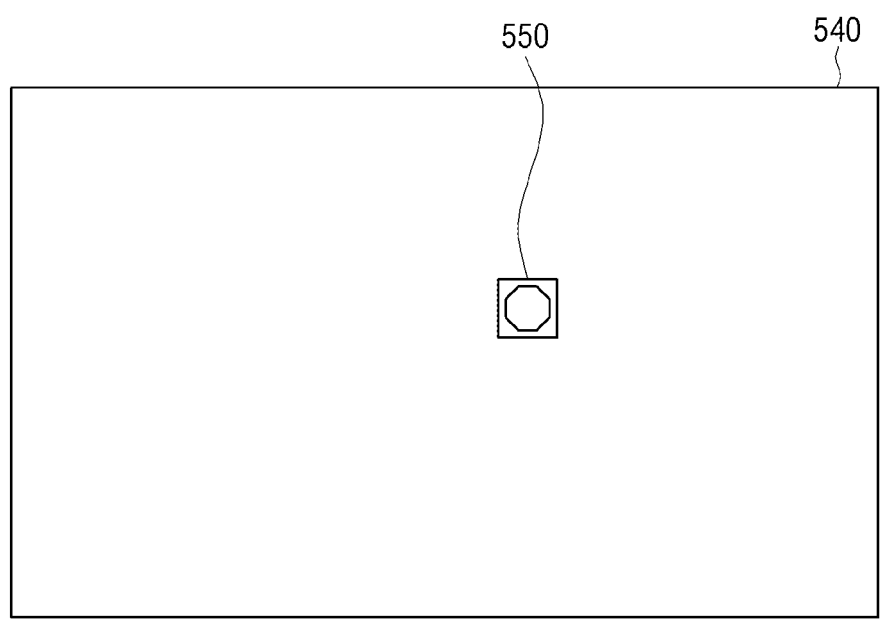

FIGS. 5A and 5B are views illustrating a process of identifying a second candidate area according to an embodiment of the disclosure.

FIG. 5A is a binary image 510 including only a first candidate area.

The driving assistance apparatus 100 may identify a second candidate area based on shape information included in the first candidate area. Specifically, when the reference shape information is identified in the first candidate area based on the binary image 510 acquired according to the color information, the driving assistance apparatus 100 may identify the identified first candidate area as a second candidate area.

According to FIG. 5A, the shape of an octagonal object 520 included in the binary image 510 is an octagonal shape. Since the octagonal shape is a shape stored in the reference shape information, the driving assistance apparatus 100 may identify an area including the octagonal object 520 as a second candidate area.

In addition, since the shape of the taillight 530 of the external vehicle included in the binary image 510 is an elliptical shape and is not a shape stored in the reference shape information, the driving assistance apparatus 100 may exclude an area including the taillight 530 of the external vehicle from the candidate area.

FIG. 5B may be an image including only the second candidate area 550. Only the octagonal object 520 is identified as the second candidate area 550 based on the shape information.

The driving assistance apparatus 100 may identify the second candidate area 550 as a plurality of blocks, and apply pixel information obtained based on pixel values included in each of the plurality of blocks to a training model to identify whether an object included in the second candidate area 550 is a traffic sign. This will be described in detail in FIG. 6.

Figure 6A:
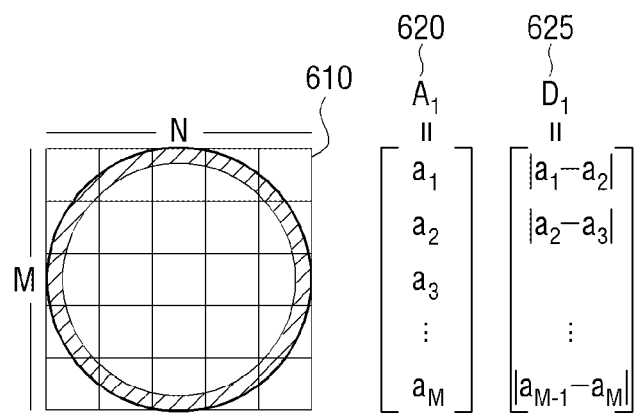
FIGS. 6A and 6B are views illustrating a process of acquiring pixel information by identifying a second candidate area as a plurality of blocks according to an embodiment of the disclosure.
Figure 6B:
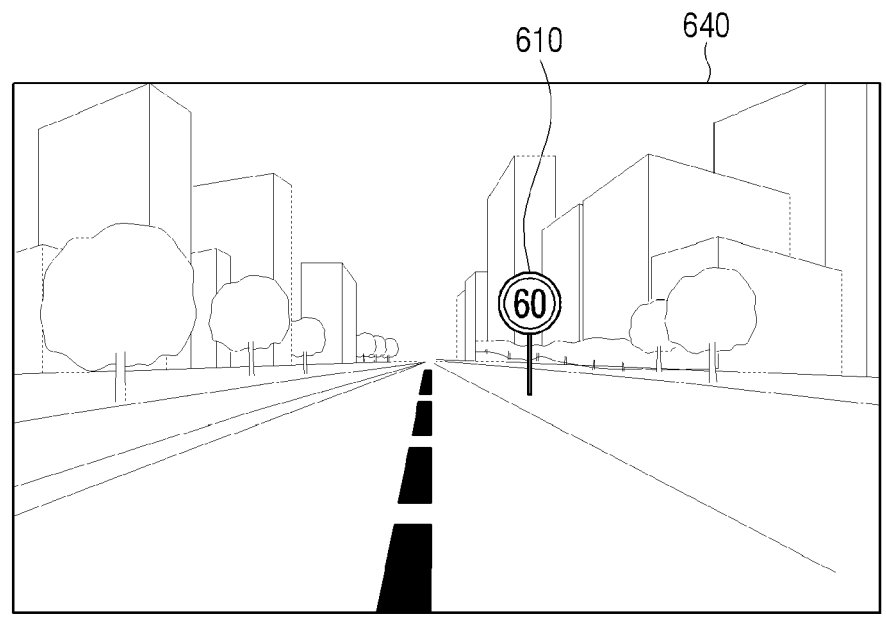
Figure 6B:
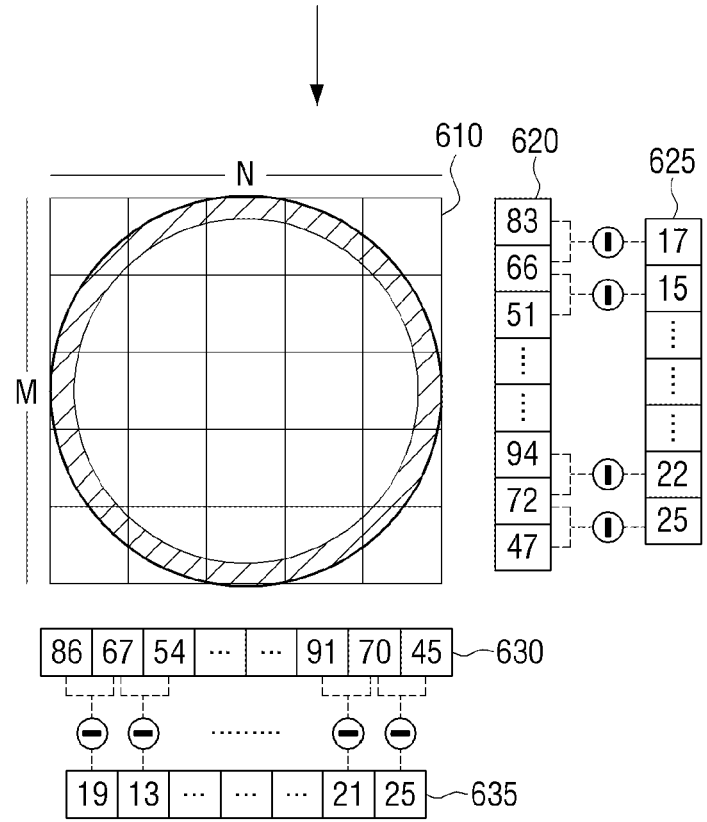

FIGS. 6A and 6B are views illustrating a process of acquiring pixel information by identifying the second candidate area as a plurality of blocks according to an embodiment of the disclosure.

FIG. 6A is a view illustrating a process of acquiring pixel information in a second candidate area 610 identified as a plurality of M*N-shaped blocks.

The driving assistance apparatus 100 may identify the second candidate area 610 based on color information and shape information in the peripheral image, and may identify the second candidate area 610 as the plurality of M*N-shaped blocks. For example, the driving assistance apparatus 100 may identify the second candidate area 610 as a plurality of M first blocks based on a horizontal direction, and identify the second candidate area 610 as a plurality of N second blocks based on a vertical direction.

The driving assistance apparatus 100 may obtain first pixel information 620 and 625 based on pixel values included in each of the M first blocks, and obtain second pixel information 630 and 635 based on pixel values included in each of the N second blocks.

The first pixel information 620 and 625 may include a difference value 624 between an average value 620 of pixels included in each of the plurality of first blocks and an average value of the pixels included in adjacent first blocks. In addition, the second pixel information 630 and 635 may include a difference value 635 between an average value 630 of pixels included in each of the plurality of second blocks and an average value of pixels included in adjacent second blocks. Also, the first pixel information and second pixel information 620 to 635 may be obtained in a form of a matrix value or a vector shape. Hereinafter, for convenience of description, the average value 620 of the pixels included in each of the plurality of first blocks is referred to as a matrix $A_1$, and the difference value 625 between the average values of pixels included in the adjacent first blocks is referred to as a matrix $D_1$, the average value 630 of pixels included in each of the plurality of second blocks is referred to as matrix $A_2$, and the difference value 635 between the average values of pixels included in adjacent second blocks is referred to as matrix $D_2$.

These matrices may be calculated through the following equation.

$$A_1(k) = \frac{1}{N}\sum_{i=1}^{N} A_{(k,i)}, 1 \leq k \leq M$$ [Equation 2]

$$A_2(r) = \frac{1}{M}\sum_{i=1}^{M} A_{(i,r)}, 1 \leq r \leq N$$ [Equation 3]

Here, the matrix $A_1$ is a matrix related to the average values of pixels included in each of the plurality of first blocks, the matrix $A_2$ is a matrix related to the average values of pixels included in each of the plurality of second blocks, and M is the number of columns, N is the number of rows, and A is a pixel value.

Matrix information 620 and 630 about the average value may include spatial information on the shape of the traffic signs, but it may not be easy to distinguish between similar shapes represented by triangles or squares. Therefore, by using not only the information on average values, but also information on matrixes 625 and 635 about difference between adjacent average values, it may more accurately calculate the pixel information for the traffic sign to be identified.

$$D_1(t) = |A_1(t+1) - A_1(t)|, 1 \leq t \leq M-1$$ [Equation 4]

$$D_2(S) = |A_2(s+1) - A_2(s)|, 1 \leq s \leq N-1$$ [Equation 5]

Here, the matrix $D_1$ is a matrix regarding difference values between average values of pixels included in adjacent first blocks, and the matrix $D_2$ is a matrix regarding difference values between average values of pixels included in adjacent second blocks.

An A1 matrix and a D1 matrix in an M*1 form, and an A2 matrix and a D2 matrix in a 1*N form may be calculated through Equations 2 to 5 described above.

The calculated A1, D1, A2, and D2 matrices may be applied to a training model as pixel information, so that whether a traffic sign is included in the second candidate area may be identified.

It may be changed to a 1*M form through a transpose matrix of A1 matrix and D1 matrix in the M*1 form, such that the A1, A2, D1, and D2 matrices may all be applied to a training model in a unified form having only one row. Alternatively, it may be changed to an N*1 form through a transpose matrix of A2 matrix and D2 matrix in the 1*N form, such that the A1, A2, D1 and D2 matrices may all be applied to the training model in a unified form having only one column.

FIG. 6B is a view illustrating an example of acquiring pixel information by identifying a second candidate area as a plurality of blocks.

The driving assistance apparatus 100 may acquire pixel information by identifying the second candidate area 610 as a plurality of M*N-shaped blocks from an acquired peripheral image 640.

Referring to FIG. 6B, the driving assistance apparatus 100 may compute an average value of each pixel of N blocks in row 1 as 83, an average value of each pixel of N blocks in row 2 as 66, and an average value of each pixel of N blocks in row M as 47. In addition, the driving assistance apparatus 100 may compute 17, which is a difference value between the average values of the first row and the second row, which are adjacent blocks, and 15, which is a difference between the average values of the second row and the third row, which are adjacent blocks.

In addition, the driving assistance apparatus 100 may compute an average value of each pixel of M blocks in column 1 as 86, an average value of each pixel of M blocks in column 2 as 67, and an average value of each pixel of M blocks in column N as 45. In addition, the driving assistance apparatus 100 may compute 19, which is a difference value between the average values of the first column and the second column, which are adjacent blocks, and 13, which is a difference between the average values of the second column and the third column, which are adjacent blocks.

The driving assistance apparatus 100 may compute an average value of the pixels included in each of the first blocks 620, a difference value between the average values of the pixels included in the adjacent first block 625, average value of pixels included in each of the plurality of second blocks 630, and a difference value between the average values of pixels included in the adjacent second blocks 635.

Then, the driving assistance apparatus 100 may apply the pixel information 620 to 635 acquired based on the pixel values included in each of the plurality of blocks to the training model, such that the apparatus may identify whether an object included in the second candidate area 610 is a traffic sign.

When the second candidate area 610 is identified as including a traffic sign by the training model, the driving assistance apparatus 100 may identify numbers or symbols inside the traffic sign for the second candidate area through image recognition technology to identify at least one of a type and an instruction content of the sign. For example, the driving assistance apparatus 100 may obtain the number "60" displayed inside the traffic sign through OCR technology, and identify that a maximum speed of the road on which the vehicle is currently driving is 60 Km/h.

Figure 7A:
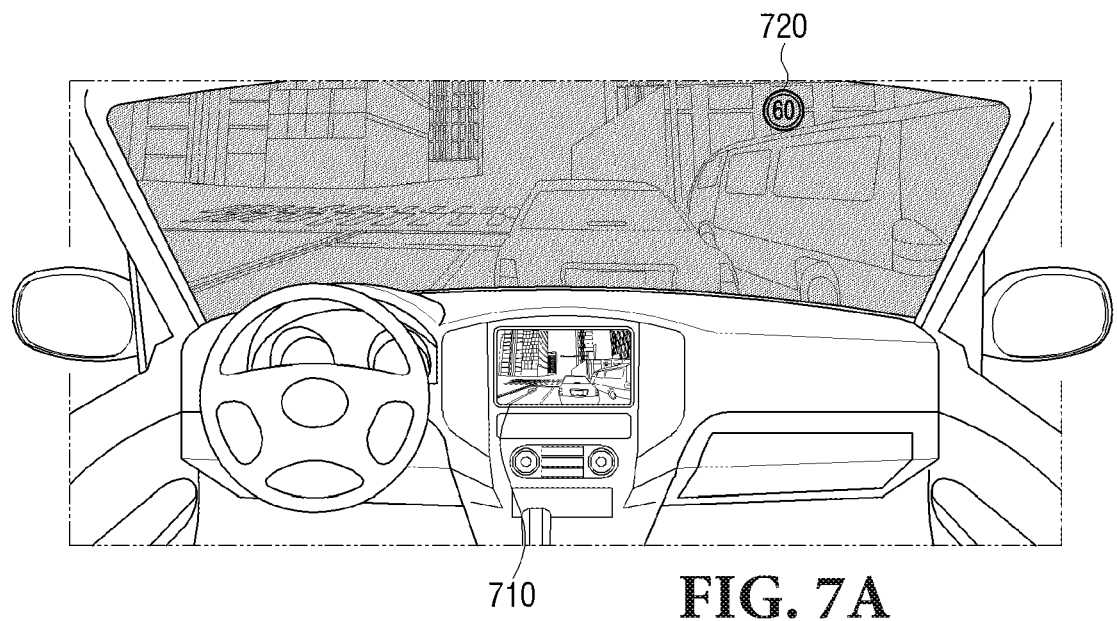
FIGS. 7A and 7B are views illustrating an operation of providing information on an identified traffic sign area to a user according to an embodiment of the disclosure.
Figure 7B:
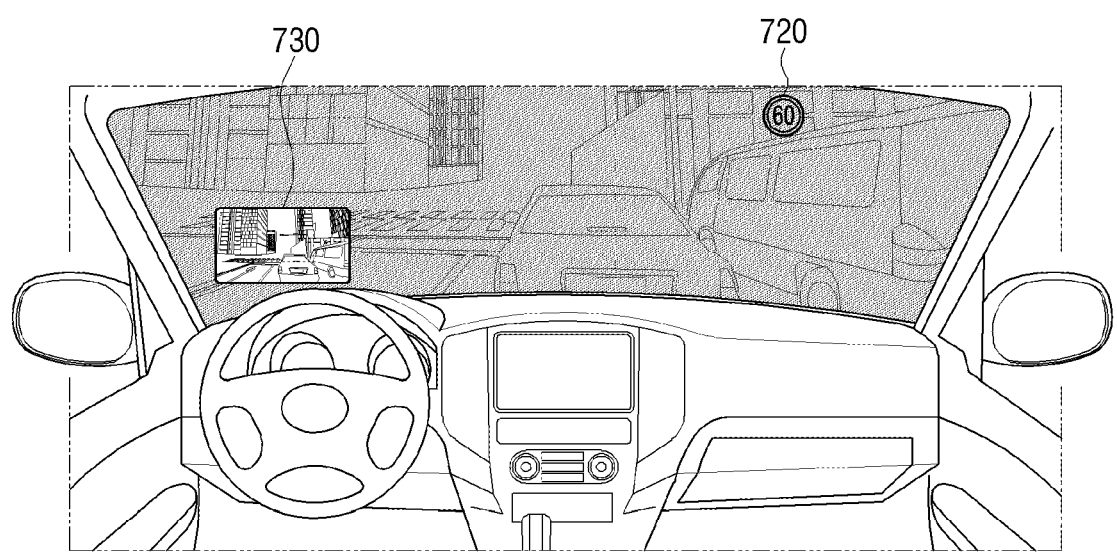

FIGS. 7A and 7B are views illustrating an operation of providing information on an identified traffic sign area to a user according to an embodiment of the disclosure.

According to FIG. 7A, the driving assistance apparatus 100 may display a peripheral image acquired by an image capturing part through a display 710 provided in a dashboard, a navigation system, or the like.

In particular, when the second candidate area is identified as including a traffic sign 720 by the training model, the driving assistance apparatus 100 may provide at least one of the type and instruction content of the traffic sign identified through OCR technology through the 710.

For example, as shown in FIG. 7A, the driving assistance apparatus 100 may acquire the number "60" displayed inside the traffic sign 720 to identify that the maximum speed of the road the vehicle is currently driving is 60 Km/h. The driving assistance apparatus 100 may provide information that the speed limit of the road that the vehicle is currently driving is 60 Km/h to the user through the display 710. In addition, the driving assistance apparatus 100 may automatically control the vehicle such that the maximum speed of the vehicle does not exceed 60 Km/h.

Referring to FIG. 7B, the driving assistance apparatus 100 may display a peripheral image acquired by the image capturing part through a HUD display 730. In addition, the driving assistance apparatus 100 may display information on the traffic sign 720 through the HUD display 730.

For example, the driving assistance apparatus 100 may provide information that the speed limit of the road that the vehicle is driving is 60 Km/h to the user through the HUD display 730. In addition, the driving assistance apparatus 100 may automatically control the vehicle such that the maximum speed of the vehicle does not exceed 60 Km/h.

Figure 8:
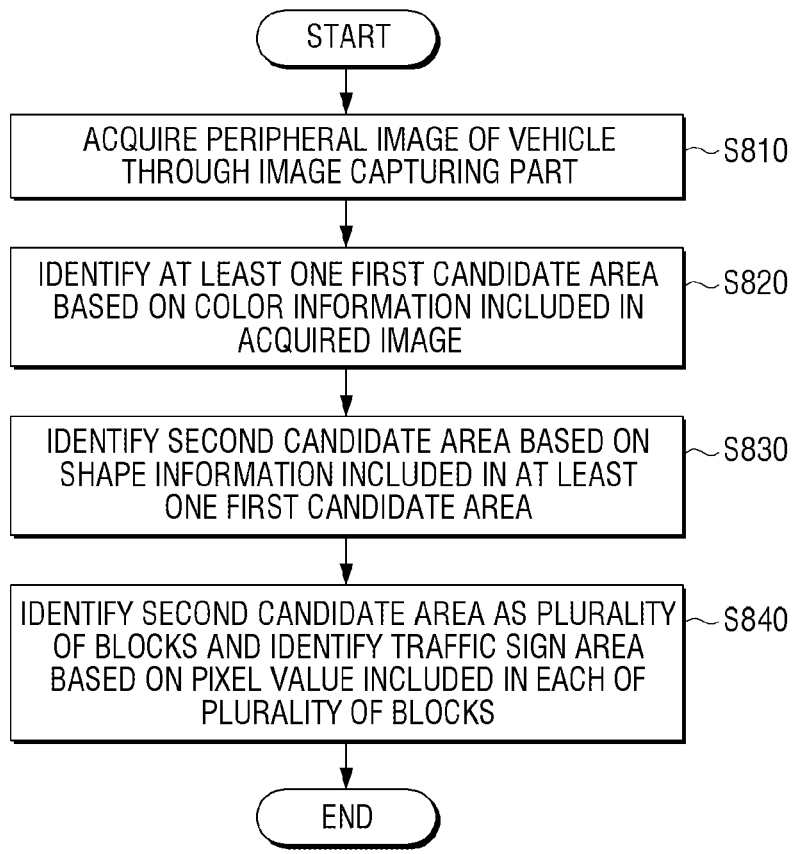
FIG. 8 is a flowchart illustrating a method of controlling a driving assistance apparatus according to an embodiment of the disclosure.

FIG. 8 is a flowchart illustrating an image processing method according to an embodiment of the disclosure.

The driving assistance apparatus may acquire a peripheral image of a vehicle through the image capturing part (S810).

The driving assistance apparatus may identify a first candidate area based on color information included in the peripheral image (S820).

Specifically, the driving assistance apparatus may identify red (R) color, green (G) color, and blue (B) color values included in the peripheral image, and identify an area where a pixel value of R color is equal to or greater than a predetermined multiple of pixel values of G and B color as the first candidate area.

The predetermined multiple may be updated based on at least one of illuminance and rainfall of surrounding environment.

The driving assistance apparatus may identify a second candidate area based on shape information included in the first candidate area (S830).

Specifically, when the first candidate area is identified, the driving assistance apparatus may acquire a binary image including only the first candidate area among the peripheral images, and identify the second candidate area based on the acquired binary image. have. When reference shape information of a traffic sign pre-stored in the first candidate area is identified, the driving assistance apparatus may identify the first candidate area as the second candidate area.

The driving assistance apparatus may identify the second candidate area as a plurality of blocks, and may identify a traffic sign area based on pixel values included in each of the plurality of blocks (S840).

Specifically, the driving assistance apparatus may identify the second candidate area as a plurality of first blocks based on a first direction, acquire first pixel information based on pixel values included in each of the plurality of first blocks, identify the second candidate area as a plurality of second blocks based on a second direction, and acquire second pixel information based on pixel values included in each of the plurality of second blocks. Then, the driving assistance apparatus may identify the traffic sign area based on the first pixel information and the second pixel information.

The first pixel information may include a difference value between an average value of a pixel included in each of the plurality of first blocks and an average value of a pixel included in adjacent first blocks. In addition, the second pixel information may include a difference value between an average value of pixels included in each of the plurality of second blocks and an average value of pixels included in adjacent second blocks.

The driving assistance apparatus may identify a traffic sign area by applying the first pixel information and the second pixel information to a training model. The training model may be a model acquired by identifying a plurality of sample traffic sign images as a plurality of blocks and learning pixel information based on pixel values included in each of the plurality of blocks.

The driving assistance apparatus may provide at least one of a type and an instruction content of the identified traffic sign.

In addition, the driving assistance apparatus may be automatically controlled based on at least one of the type and instruction content of the traffic sign.

Since detailed operations of each step have been described above, detailed descriptions will be omitted.

Meanwhile, at least some of the above-described methods according to various embodiments of the disclosure may be installed in an existing driving assistance apparatus, and may be implemented in a form of an application, which is software directly used by the user on an OS. The application may be provided in a form of an icon interface on a display screen of the vehicle.

Further, the methods according to the above-described example embodiments may be realized by upgrading the software or hardware of the existing electronic apparatus.

Various exemplary embodiments described above may be embodied in a recording medium that may be read by a computer or a similar apparatus to the computer by using software, hardware, or a combination thereof. In some cases, the embodiments described herein may be implemented by a processor itself. In a software configuration, various embodiments described in the specification such as a procedure and a function may be embodied as separate software modules. The software modules may respectively perform one or more functions and operations described in the present specification.

Methods of controlling a display apparatus according to various exemplary embodiments may be stored on a non-transitory readable medium.

The non-transitory computer readable recording medium refers to a medium that stores data and that can be read by devices. For example, the non-transitory computer-readable medium may be CD, DVD, a hard disc, Blu-ray disc, USB, a memory card, ROM, or the like.

The foregoing exemplary embodiments and advantages are merely exemplary and are not to be construed as limiting the disclosure. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A driving assistance apparatus comprising:
   an image sensor; and
   a processor configured to identify a specific color area in a peripheral image captured by the image sensor as a first candidate area, identify an area including a specific shape in the first candidate area as a second candidate area, and identify an area of a traffic sign in the second candidate area,
   wherein the processor is configured to:
      identify the second candidate area as a plurality of first blocks based on a first direction, and acquire first pixel information based on a pixel value included in each of the plurality of first blocks,
      identify the second candidate area as a plurality of second blocks based on a second direction, and acquire second pixel information based on a pixel value included in each of the plurality of second blocks, and
      identify an area of the traffic sign based on the first pixel information and the second pixel information,
   wherein the first pixel information includes a difference value between an average value of pixels included in each of the plurality of first blocks, and an average value of pixels included in adjacent first blocks, and
   wherein the second pixel information includes a difference value between an average value of pixels included in each of the plurality of second blocks, and an average value of pixels included in adjacent second blocks.

2. The apparatus of claim 1, wherein the processor is configured to apply the first pixel information and the second pixel information to a training model to identify the area of the traffic sign, and
wherein the training model is configured to identify a plurality of sample traffic sign images as a plurality of blocks, and learn and obtain pixel information based on pixel values included in each of the plurality of blocks.

3. A driving assistance apparatus comprising:
an image sensor;
at least one among an illuminance sensor and a rain sensor; and
a processor configured to identify a specific color area in a peripheral image captured by the image sensor as a first candidate area, identify an area including a specific shape in the first candidate area as a second candidate area, and identify an area of a traffic sign in the second candidate area,
wherein the processor is configured to:
identify red (R) color, green (G) color, and blue (B) color included in the peripheral image, and
identify an area in which a pixel value of the R color is equal to or greater than a predetermined multiple of pixel values of the G color and the B color as the first candidate area, and
wherein the multiple is updated based on at least one of illuminance measured by the illuminance sensor or rainfall measured by the rain sensor.

4. The apparatus of claim 1, wherein the processor is configured to, based on the first candidate area being identified, acquire a binary image including only the first candidate area among the peripheral image, and
identify the second candidate area based on the acquired binary image.

5. The apparatus of claim 1, further comprising:
a storage configured to store reference shape information of a traffic sign,
based on the reference shape information being identified in the first candidate area, identifying the first candidate area as the second candidate area.

6. The apparatus of claim 1, further comprising:
a display,
wherein the processor is configured to control the display to identify and provide at least one of a type or an instruction content of the traffic sign in the identified traffic sign area, and
based on at least one of the type or the instruction content of the traffic sign, control the vehicle.

7. A method of image processing comprising:
acquiring a peripheral image of a vehicle through an image sensor;
identifying a first candidate area based on color information included in the acquired peripheral image;
identifying a second candidate area based on shape information included in the first candidate area; and
identifying the second candidate area as a plurality of blocks, and identifying an area of traffic sign based on pixel values included in each of the plurality of blocks,
wherein the identifying the traffic sign area comprises:
identifying the second candidate area as a plurality of first blocks based on a first direction, and acquiring first pixel information based on a pixel value included in each of the plurality of first blocks,
identifying the second candidate area as a plurality of second blocks based on a second direction, and acquiring second pixel information based on a pixel value included in each of the plurality of second blocks, and
identifying an area of the traffic sign based on the first pixel information and the second pixel information,
wherein the first pixel information includes a difference value between an average value of pixels included in each of the plurality of first blocks, and an average value of pixels included in adjacent first blocks, and
wherein the second pixel information includes a difference value between an average value of pixels included in each of the plurality of second blocks, and an average value of pixels included in adjacent second blocks.

8. The method of claim 7, wherein the identifying the traffic sign area comprises applying the first pixel information and the second pixel information to a training model to identify the area of the traffic sign, and
wherein the training model is configured to identify a plurality of sample traffic sign images as a plurality of blocks, and learn and obtain pixel information based on pixel values included in each of the plurality of blocks.

9. The method of claim 7, wherein the identifying the first candidate area comprises:
identifying red (R) color, green (G) color, and blue (B) color included in the peripheral image, and
identifying an area in which a pixel value of the R color is equal to or greater than a predetermined multiple of pixel values of the G color and the B color as the first candidate area.

10. The method of claim 9, wherein the multiple is updated based on at least one of illuminance or rainfall.

* * * * *